(12) United States Patent
Regantini et al.

(10) Patent No.: US 9,601,856 B2
(45) Date of Patent: Mar. 21, 2017

(54) CONNECTING DEVICE FOR A SWITCHGEAR APPARATUS

(71) Applicant: ABB TECHNOLOGY AG, Zurich (CH)

(72) Inventors: Annunzio Regantini, Capriate S. Gervasio (IT); Stefano Magoni, Osio Sotto (IT)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 14/908,876

(22) PCT Filed: Jul. 28, 2014

(86) PCT No.: PCT/EP2014/066212
§ 371 (c)(1),
(2) Date: Jan. 29, 2016

(87) PCT Pub. No.: WO2015/014812
PCT Pub. Date: Feb. 5, 2015

(65) Prior Publication Data
US 2016/0190721 A1    Jun. 30, 2016

(30) Foreign Application Priority Data

Jul. 30, 2013    (EP) .................................. 13178452

(51) Int. Cl.
*H01R 13/18*    (2006.01)
*H02B 11/04*    (2006.01)
(Continued)

(52) U.S. Cl.
CPC .............. *H01R 13/18* (2013.01); *H01R 13/11* (2013.01); *H02B 11/04* (2013.01); *H02B 11/173* (2013.01); *H01H 33/6606* (2013.01)

(58) Field of Classification Search
CPC .................................................... H01R 13/111
(Continued)

(56) References Cited

U.S. PATENT DOCUMENTS 2,086,424 A * 7/1937 Koehler ............. H01R 13/6315
439/248
2,125,816 A * 8/1938 Reynolds ............... H01R 13/28
174/21 CA
(Continued)

FOREIGN PATENT DOCUMENTS

DE    297 23 298 U1    7/1998
EP    1 632 969 A2    3/2006
(Continued)

OTHER PUBLICATIONS

International Search Report (PCT/ISA/210) issued on Oct. 17, 2014, by the European Patent Office as the International Searching Authority for International Application No. PCT/EP2014/066212.
(Continued)

*Primary Examiner* — Ross Gushi
(74) *Attorney, Agent, or Firm* — Taft Stettinius & Hollister LLP (57) ABSTRACT

A connecting-device for a switchgear apparatus, includes: tulip-cluster-portions for electrically engaging with a contact-stud-element; a mounting-end-part for the mechanical connection to a pole-terminal, and conductive-transmitting-portions for transmitting electrical current from the contact-stud-element to the pole-terminal, each of the conductive-transmitting-portions extending from the respective tulip-cluster-portion to a respective base-portion of the mounting-end-part. The tulip-cluster-portions with the respective conductive-transmitting-portions and with the respective base-portions are integral with one other so as to define respective single-piece-portions.

14 Claims, 5 Drawing Sheets

(51) Int. Cl.
*H01R 13/11* (2006.01)
*H02B 11/173* (2006.01)
*H01H 33/66* (2006.01)

(58) Field of Classification Search
USPC .................. 439/246, 247, 248, 249, 251
See application file for complete search history.

(56) References Cited

U.S. PATENT DOCUMENTS

| | | | | |
|---|---|---|---|---|
| 2,176,718 A * | 10/1939 | Linde | ............... | H02B 11/04 200/260 |
| 2,265,006 A * | 12/1941 | Rubel | ............... | H01H 1/46 200/258 |
| 2,269,314 A * | 1/1942 | MacDonald | ......... | H01R 13/193 439/682 |
| 2,331,255 A * | 10/1943 | West | ............... | H01H 1/36 200/16 E |
| 2,376,818 A * | 5/1945 | Rubel | ............... | H01H 1/38 200/253.1 |
| 2,430,270 A * | 11/1947 | Bergan | ............... | H01R 35/04 236/1 R |
| 2,702,376 A * | 2/1955 | Brush | ............... | H03F 3/54 439/252 |
| 3,097,904 A * | 7/1963 | Yarrick | ............... | H01H 1/38 439/252 |
| 3,842,497 A * | 10/1974 | Kehl | ............... | H01R 4/20 29/862 |
| 3,867,602 A * | 2/1975 | Jawelak | ............... | H01H 1/385 200/253.1 |
| 4,002,400 A * | 1/1977 | Evans | ............... | H01R 13/111 439/748 |
| 4,072,392 A * | 2/1978 | McConnell | ............... | H01R 13/33 439/851 |
| 4,906,212 A * | 3/1990 | Mixon, Jr. | ............... | H01R 13/111 439/857 |
| 4,913,658 A * | 4/1990 | Borgstrom | ............... | H01R 13/53 439/185 |
| 5,135,403 A * | 8/1992 | Rinaldi | ............... | H01R 12/585 439/82 |
| 5,358,433 A * | 10/1994 | Dechanteloup | ....... | H01R 13/111 439/843 |
| 5,362,244 A * | 11/1994 | Hanson | ............... | H01R 13/41 439/82 |
| 5,397,253 A * | 3/1995 | Fries | ............... | H01R 13/53 439/824 |
| 5,419,723 A * | 5/1995 | Villiers | ............... | H01R 13/187 439/246 |
| 5,482,481 A * | 1/1996 | Takeuchi | ............... | H01H 1/38 439/251 |
| 5,525,069 A * | 6/1996 | Roscizewski | ......... | H01R 13/53 439/184 |
| 5,775,960 A * | 7/1998 | Saito | ............... | H01R 13/187 439/843 |
| 5,857,879 A * | 1/1999 | Endo | ............... | H01R 43/16 439/843 |
| 5,919,066 A * | 7/1999 | Harting | ............... | H01R 13/052 439/825 |
| 5,938,487 A * | 8/1999 | Henry | ............... | H01R 13/111 439/851 |
| 6,024,611 A * | 2/2000 | Giuseppe | ............... | H01H 1/38 439/819 |
| 6,059,577 A * | 5/2000 | Eriksson | ............... | H01H 1/38 439/8 |
| 6,086,398 A * | 7/2000 | Ookawa | ............... | H01H 1/38 439/251 |
| 6,102,751 A * | 8/2000 | Becker | ............... | H01R 13/42 439/784 |
| 6,139,347 A * | 10/2000 | Nebon | ............... | H02B 11/04 439/251 |
| 6,186,841 B1 * | 2/2001 | Jacobsson | ............... | H01R 13/111 439/851 |
| 6,250,974 B1 * | 6/2001 | Kerek | ............... | H01R 13/187 439/843 |
| 6,264,508 B1 * | 7/2001 | Lehmann | ............... | H01R 13/187 439/843 |
| 6,273,764 B1 * | 8/2001 | Harting | ............... | H01R 4/20 439/723 |
| 6,475,039 B1 * | 11/2002 | Despouys | ............... | H01R 13/11 439/843 |
| 6,497,579 B1 * | 12/2002 | Garbini | ............... | H01R 13/6315 439/246 |
| 6,773,285 B2 * | 8/2004 | Bernat | ............... | H01R 13/6315 439/246 |
| 6,899,572 B1 * | 5/2005 | Baker | ............... | H01R 13/111 439/181 |
| 6,908,325 B2 * | 6/2005 | Bernat | ............... | H01R 13/6315 439/246 |
| 6,976,862 B1 * | 12/2005 | Ormazabal Ocerin | | H01R 13/18 439/246 |
| 6,979,235 B2 * | 12/2005 | Lappohn | ............... | H01R 13/111 439/733.1 |
| 7,112,078 B2 * | 9/2006 | Czikora | ............... | H01R 13/6315 439/248 |
| 7,357,657 B2 * | 4/2008 | Wells | ............... | H01R 13/639 439/263 |
| 7,393,252 B2 * | 7/2008 | Ribeau | ............... | H01R 13/187 439/843 |
| 7,942,682 B2 * | 5/2011 | Copper | ............... | H01R 13/187 439/185 |
| 8,007,301 B2 * | 8/2011 | Andersen | ............... | H01R 13/112 439/251 |
| 8,269,127 B2 * | 9/2012 | Seo | ............... | H01H 1/38 218/123 |
| 8,414,321 B2 * | 4/2013 | Schuldt | ............... | H01R 13/11 361/807 |
| 8,460,009 B1 * | 6/2013 | Topolewski | ......... | B23K 1/0016 439/65 |
| 8,568,163 B2 * | 10/2013 | Burris | ............... | H01R 13/6277 439/578 |
| 8,641,437 B2 * | 2/2014 | Tu | ............... | H01H 1/385 439/251 |
| 8,702,438 B2 * | 4/2014 | Frank | ............... | H01R 13/111 439/268 |
| 8,782,883 B2 * | 7/2014 | Shimizu | ............... | H01R 13/111 29/874 |
| 8,801,459 B2 * | 8/2014 | Mrowka | ............... | H01R 24/54 439/246 |
| 8,840,436 B2 * | 9/2014 | Mott | ............... | H01R 13/111 439/843 |
| 8,851,940 B2 * | 10/2014 | Friedhof | ............... | H01R 13/111 439/843 |
| 8,876,562 B2 * | 11/2014 | Glick | ............... | H01R 13/187 439/843 |
| 8,926,352 B2 * | 1/2015 | Wang | ............... | H01R 12/57 439/250 |
| 9,009,960 B2 * | 4/2015 | Vaccaro | ............... | H01R 13/111 29/874 |
| 9,039,433 B2 * | 5/2015 | Barthelmes | ............... | H01R 12/91 439/248 |
| 9,325,095 B2 * | 4/2016 | Glick | ............... | H01R 13/187 |
| 9,352,708 B2 * | 5/2016 | Mott | ............... | B60R 16/03 |
| 9,356,377 B2 * | 5/2016 | Mott | ............... | H01R 13/111 |
| 2004/0038586 A1 * | 2/2004 | Hall | ............... | H01R 13/6315 439/578 |
| 2004/0229490 A1 * | 11/2004 | Bernat | ............... | H01R 13/6315 439/246 |
| 2006/0049144 A1 | 3/2006 | Vaghini et al. | | |
| 2006/0194465 A1 * | 8/2006 | Czikora | ............... | H01R 13/6315 439/248 |
| 2009/0047814 A1 * | 2/2009 | Daamen | ............... | H01R 13/6315 439/251 |
| 2009/0149086 A1 * | 6/2009 | Dahms | ............... | H01R 12/52 439/835 |
| 2010/0007441 A1 * | 1/2010 | Yagisawa | ............... | H01P 5/026 333/185 |
| 2011/0237124 A1 * | 9/2011 | Flaherty | ............... | H01R 13/6277 439/578 |

(56) References Cited

U.S. PATENT DOCUMENTS

| | | | |
|---|---|---|---|
| 2012/0129374 A1* | 5/2012 | Tu | H01H 1/385 439/312 |
| 2012/0282797 A1* | 11/2012 | Mott | H01R 13/111 439/357 |
| 2013/0017739 A1* | 1/2013 | Glick | H01R 13/187 439/842 |
| 2014/0038473 A1* | 2/2014 | Kojima | H01R 13/111 439/851 |
| 2014/0138357 A1 | 5/2014 | Kasza et al. | |
| 2015/0118899 A1* | 4/2015 | Hugel | H01R 24/542 439/578 |
| 2015/0118904 A1* | 4/2015 | Baechle | H01R 12/716 439/591 |
| 2015/0126076 A1* | 5/2015 | Horiuchi | H01R 13/111 439/691 |
| 2015/0194748 A1* | 7/2015 | Vaccaro | H01R 13/111 439/578 |
| 2015/0357732 A1* | 12/2015 | Casses | H01R 11/288 439/754 |

FOREIGN PATENT DOCUMENTS

| | | |
|---|---|---|
| EP | 2 434 508 A1 | 3/2012 |
| EP | 2 551 869 A1 | 1/2013 |
| FR | 1.126.110 A | 11/1956 |

OTHER PUBLICATIONS

Written Opinion (PCT/ISA/237) issued on Oct. 17, 2014, by the European Patent Office as the International Searching Authority for International Application No. PCT/EP2014/066212.

* cited by examiner

CONNECTING DEVICE FOR A SWITCHGEAR APPARATUS

This disclosure claims priority under 35 U.S.C. §119 to European Application No. 13178452.2 filed Jul. 30, 2013, and under 35 U.S.C. §371 to International Application No. PCT/EP2014/066212 filed Jul. 28, 2014, the contents of which are incorporated herein by reference for all purposes.

The present disclosure relates to a connecting-device for a switchgear apparatus, in particular a connecting-device suitable for connecting a movable conducting terminal of a switching device, in particular of a circuit-breaker, to a stationary conducting terminal of a switchgear apparatus.

In the medium voltage field, it is known the use of a tulip-contact-assembly for the electrical connection of a movable conducting terminal, provided on a draw-out circuit breaker, to a stationary conducting terminal of switchgear.

A known tulip-contact-assembly comprises a support-frame which is defined by a pair of star-shaped flanges which are mutually parallel and spaced apart and which are fixed to one other by rod elements. The tulip-contact-assembly comprises a plurality of distinct and separated contact-fingers which rest into seat-portions obtained on the star-shaped flanges and are urged against the latter by helicoidal springs extending with a ring-shape around a central axis of the support-frame. Suitable external recesses are obtained on the contact-fingers in order to house, and keep in a correct position, the helicoidal springs. In a further type of tulip-contact-assembly the support-frame comprises, instead of the pair of star-shaped flanges, a solid support-core-element with which the contact-fingers are coupled through more helicoidal springs and apposite anchoring elements. Therefore, such a tulip-contact-assembly comprises a rather high number of distinct interconnected components, each of which is subjected to dedicated manufacturing-processes.

Each contact-finger extends parallel to the above mentioned central axis and comprises a front contact-portion for removably engaging with a stationary contact-pin of switchgear, and a rear-contact-portion intended to keep in contact with a conducting-arm of the movable circuit breaker.

The front contact-portion and the rear-contact portion have rectangular cross-sections and plane-contact-surfaces and tangentially contact with the curved surface of the stationary contact-pin and of the conducting-arm respectively. This means that the front contact-portion and the rear-contact-portion touch the stationary contact-pin and the conducting-arm respectively in single localised contact zones. In order to improve the electrical transmission capability, a further type of tulip-contact-assembly has been proposed in the past which comprises a greater number of contact-fingers, compared with the above discussed type of tulip-contact-assembly, and which increases the number of electrical contact-zones with the stationary contact-pin and with the conducting-arm. In this type, the contact-fingers are distributed around the central axis in pairs and each contact-finger has a smaller thickness with respect to the previously discussed contact-fingers. Nevertheless such a tulip-contact-assembly is even more structurally complicated with respect to the previously discussed tulip-contact-assembly, due to the high number of distinct interconnected components. Furthermore, the high number of contact-fingers implies larger surfaces to be treated for complying with conductivity-requirements, and this means a cost increase in the manufacturing which makes this tulip-contact-assembly rather expensive.

All the versions of tulip-contact-assembly above discussed therefore include a remarkable plurality of distinct parts that are mutually mechanically interconnected thus defining a multitude of junction zones that prove to be rather critical as far as the heat-dissipation, electrical-transmission-capability and mechanical resistance requirements are concerned.

It would be desirable to improve the electrical connection devices, in particular by providing a technical solution which is extremely structurally simplified and cheap to be obtained and which at the same time makes possible to obtain a connection with increased conductivity performances and high mechanical reliability.

A further object is to provide a solution which is able to reduce any misalignment-difficulties, and any localization and variability of the contact-resistance in the electrical connection.

This is achieved by a connecting-device as defined in the appended claims and described herein.

According to the disclosure, there is provided a connecting-device for a switchgear apparatus, comprising:
- tulip-cluster-portions for electrically engaging with a contact-stud-element;
- a mounting-end-part for the mechanical connection to a pole-terminal,
- conductive-transmitting-portions for transmitting electrical current from said contact-stud-element to said pole-terminal, each of said conductive-transmitting-portions extending from the respective tulip-cluster-portion to a respective base-portion of said mounting-end-part,
- wherein said tulip-cluster-portions with the respective conductive-transmitting-portions and with the respective base-portions are integral with one other so as to define respective single-piece-portions.

The present disclosure encompasses also a switching device, in particular a circuit breaker, comprising one or more of such connecting-devices and a switchgear, equivalently called with the term panel or cabinet or switchboard, comprising such a switching device.

Characteristics and advantages of the present disclosure will result from the description and from claims.

The present disclosure can be better understood and implemented with reference to the attached drawings that illustrate an embodiment thereof by way of a non-limiting example, in which.

With reference to the attached Figures, a connecting-device 1 is shown, which is particularly suitable to be used, in a non-limitative way, in the Medium Voltage field, where, for the purposes of the present application, the term medium voltage refers to applications in the range from 1 kV up to some tens of kV, e.g. 52 kV. The connecting-device 1 is suitable for being mounted on a pole-terminal 6 of a switching device 30, such as a circuit breaker 30, in particular a draw-out circuit breaker 30 housed in a switchgear apparatus 2. Such a circuit breaker 30, in a non-limitative way, is of the type which is supported by a trolley that can move from an extraction position with respect to a switchgear apparatus 2, in which a movable conducting terminal is disengaged from a stationary conducting terminal such as a contact-stud-element 4, to an insertion position in the switchgear apparatus 2, in which the movable conducting terminal is connected to the respective stationary contact-stud-element 4.

In the following exemplary and not limitative description, reference is made to a connecting device 1 which is fixed to a pole-terminal 6 of the circuit breaker 30. However, in an further alternative application, it is possible for the connecting device 1 to be assembled on a stationary pole terminal provided on the stationary section of the switchgear apparatus in order to receive, and engage with, a movable conducting contact-stud-element provided on the draw-out circuit breaker 30. In other words, the connecting device 1 may equally function as a stationary-contact or as a movable-contact.

As shown in the attached Figures, the connecting-device 1 comprises a mounting-end-part 5 for the mechanical connection to the pole-terminal 6 and a plurality of finger-projections 10 suitable for electrically engaging with the contact-stud-element 4. The finger-projections 10 are arranged according to a circular pattern around a longitudinal axis 16, thus delimiting a coupling-cavity 15 for receiving the contact-stud-element 4. In particular, the finger-projections 10 are distributed around the longitudinal axis 16 in an angularly uniform manner.

All the finger-projections 10 define together a tulip-cluster-arrangement 50 placed at one end of the connecting device 1 opposite to the mounting-end-part 5. The tulip-cluster-arrangement 50 is subdivided in, and composed by, a plurality of tulip-cluster-portions 3 each comprising one or more finger-projections 10.

In other words, a group of a certain number of finger-projection 10, for example two or three or other desired number, defines a respective tulip-cluster-portion 3.

The connecting device 1 comprises, for each tulip-cluster-portion 3, a conductive-transmitting-portion 7 suitable for transmitting, when in an engagement configuration, electrical current from the contact-stud-element 4 to the above-mentioned pole-terminal 6. The conductive-transmitting-portions 7, in particular, are shaped as elongated reed elements which protrude in a cantilever manner from a respective base-portion 8 of the mounting-end-part 5.

Figures 1, 2:
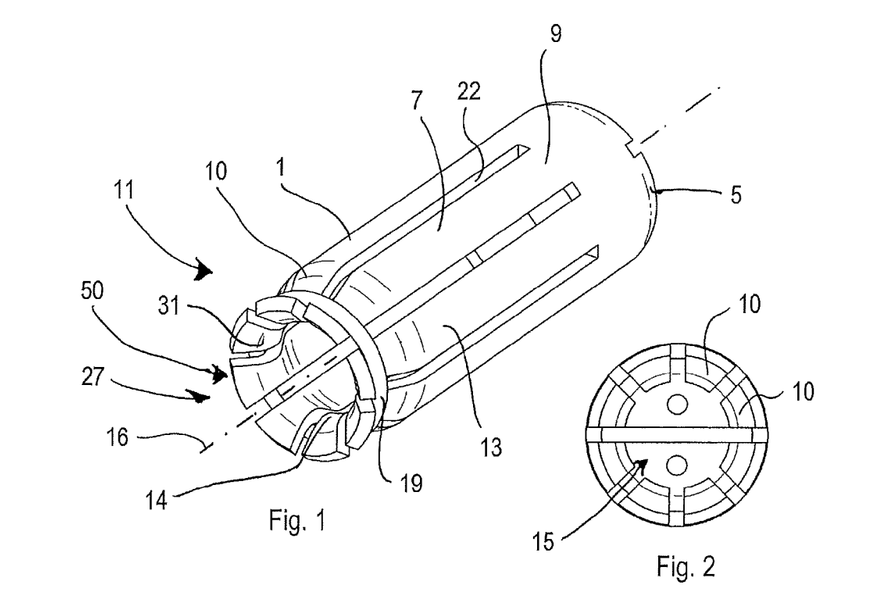
FIG. 1 is a perspective view of a connecting-device according to the present disclosure.
FIG. 2 is a front view of the connecting-device in FIG. 1.

Each tulip-cluster-portion 3 together with the respective conductive-transmitting-portion 7 and with the respective base-portion 8 are integral with one other so as to define a respective single-piece-portion 9. In the versions shown in FIGS. 1, 9 and 10, the single-piece-portions 9 are integral with one other so as to define together a single enbloc-body 11 of the connecting device 1. On the other hand, according to alternative versions, the connecting device 1 is defined by any desired number of distinct and separated single-piece-portions 9 which are adapted to be coupled together for defining one assembled-body. In the exemplary non limitative version shown in FIG. 3, the connecting device 1 is defined by four single-piece-portions 9 which are configured as distinct extended elements intended to be mutually assembled for defining a single body of the connecting device 1. In this case, each single-piece-portion 9 comprises two finger-projections 10 integral with, and protruding from, a common base portion 8.

However, instead of three, the connecting device 1 may also comprise a different desired number of single-piece-portions 9.

Figure 3:
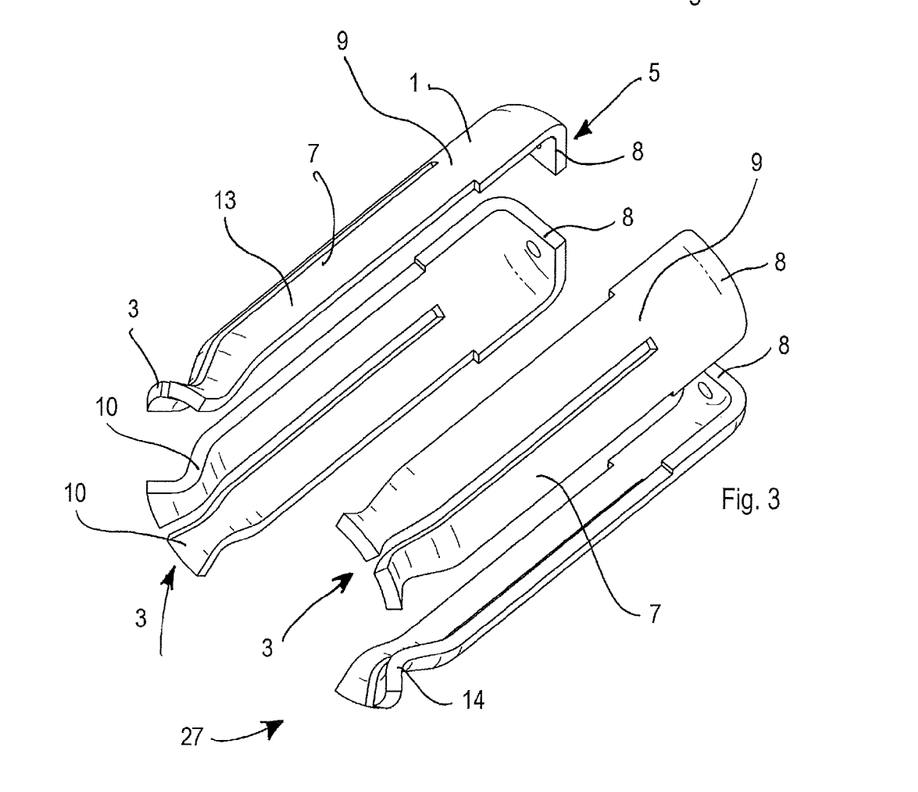
FIG. 3 is a perspective view of a further version of the connecting-device according to the invention.
Figure 4:
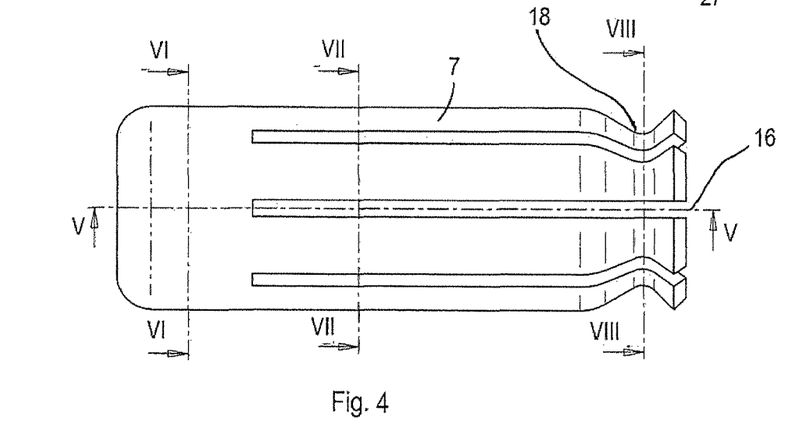
FIGS. 4 and 5 are a longitudinal section and a side view respectively of the connecting-device in FIG. 1.

Therefore, the connecting device 1 may be obtained as a one-part device, (version shown of FIG. 1), or as a multi-part device, according to the exemplary version of FIG. 3.

All these different alternative versions have in common the following technical feature: from each free end of the finger-projections 10 up to the respective base portion 8 in the mounting-end-part 5 there are no junction zones nor coupled distinct components, but a single integral-material-portion (i.e. the single-piece-portion 9) which extends for the entire length of the connecting device 1. In other words, differently from the prior art tulip devices which include distinct components mutually coupled and each with a dedicated function (i.e. the finger portion having contact-function, the support frame, the helicolidal springs, and the transmitting electrical conductive arm), in the connecting device 1 of the invention every single-piece-portion 9 exerts all necessary functions. In other terms, each single-piece-portion 9 is self-supporting, is self-elastically-biased and acts for contacting the contact-stud-element 4 and transmitting the electrical current.

In all versions, the connecting device 1, owing to its structural simplicity, is suited to be advantageously and easily obtained from a metal sheet. In particular, the connecting device 1 is obtainable by subjecting the metal sheet to shearing, rolling and folding operations.

In particular, the connecting device 1 is obtained from an Al and/or Cu metal sheet.

In all the above-mentioned versions, the connecting device 1 acts as an integrated contact arm having a contact arm and a cluster arrangement obtained in one piece, differently from the prior art tulip systems which include distinct and separated contact-fingers whose rear-contact-portions are kept in contact with a distinct conducting-arm.

Each finger-projection 10 comprises a flexing-strip-zone 13 included in the respective conductive-transmitting-portion 7, and a contact-bent-end 14 which is adapted for going into contact with the contact-stud-element 4. The flexing-strip-zone 13 is configured for elastically flexing upon a relative inserting-engagement of the contact-stud-element 4 into the coupling-cavity 15. By properly choosing geometrical parameter of the flexing-strip-zone 13 such as thickness and/or cross-section profile and/or length, a desired/required flexibility for the finger-projection 10 is achieved. Furthermore, the finger-projections 10 are separated from one other by elongated gaps 22 extending from the mounting-end-part 5 to a front end 27 of the connecting device 1. The elongated gaps 22, in combination with a suitable geometry of the flexing-strip-zones 13, provide the required resilient flexibility to the finger-projections 10 and make possible for the finger-projections 10 to flex and to move away from one other in their radial and centrifugal expanding movement.

The elongated gaps 22 have also a function of promoting a heat-dissipating-action.

Each contact-bent-end 14 protrudes towards the longitudinal axis 16 in the coupling-cavity 15.

The contact-bent-end 14 comprises an internal curved surface 17 which is adapted to promote a resilient deformation of the finger-projection 10 upon a pushing-action of the contact-stud-element 4 in order to facilitate insertion of the latter into the coupling-cavity 15. In particular, each contactbent-end 14 comprises on the internal curved surface 17 a front leading-zone, sloping toward the longitudinal axis 16, and configured for receiving the pushing-action of the contact-stud-element 4. The front-leading zones all together define on the tulip-cluster-arrangement 50 a conical-frustum-insertion-band 31 which promotes insertion of the contact-stud-element 4 into the coupling cavity 15.

Figure 5:
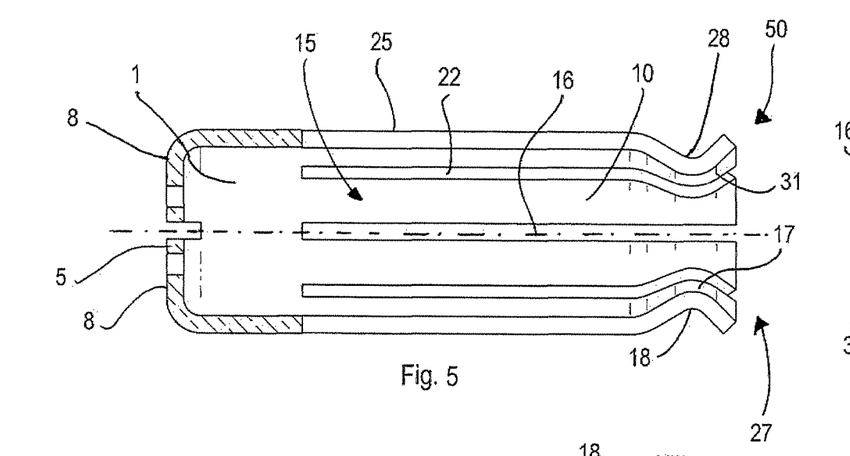
Figure 6:
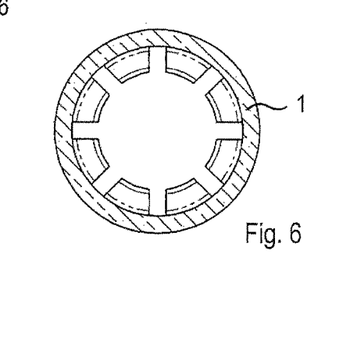
FIG. 6 is a cross-section view taken along the plane VI-VI in FIG. 4.
Figure 7:
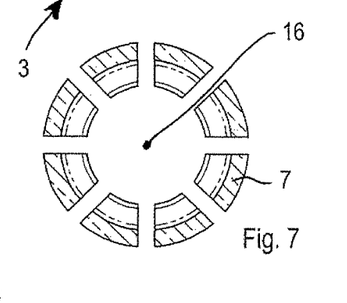
FIG. 7 is a cross-section view taken along the plane VII-VII in FIG. 4.
Figure 8:
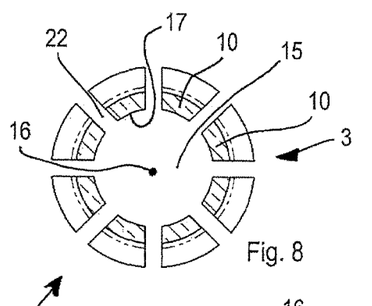
FIG. 8 is a cross-section view taken along the plane VIII-VIII in FIG. 4.

As better visible for example in FIG. 5, the internal curved surface 17 has a convex profile according to a plane which is parallel to said longitudinal axis 16. As shown in FIG. 8, the internal curved surface 17 has a concave profile according to a plane which is transverse to the longitudinal axis 16. The concave profile has a bend-radius which is chosen according to the external bend-radius of the contact-stud-element 4 in order to achieve a large contact-area in a mutual engagement configuration.

Such a concave profile of the internal curved surface 17 enables the contact-bent-ends 14 to effectively mate with the cylindrical surface of the contact-stud-element 4. A large contact zone between the connecting device 1 and the contact-stud-element 4 is achieved which improves in general the electrical conductivity capability and minimizes the rise and concentration of heat due to the current as well.

On each contact-bent-end 14 there is obtained an external groove-surface 18 configured for receiving an auxiliary elastic element 19 adapted for urging the finger-projections 10 towards a mutual radially collapsed position.

Each finger-projection 10 can be configured so as to autonomously urge itself towards the longitudinal axis 16. However, the auxiliary elastic element 19 further helps to keep the finger-projections 10, in particular the contact-bent-ends 14, pressed against the contact-stud-element 4 under optimal pressure conditions. As the auxiliary elastic element 19 further presses the contact-bent-ends 14 against the contact-stud-element 14, the contact resistance is further reduced, local overheating is avoided and integrity of the material is preserved.

Therefore, the connecting-device 1 has an external longitudinal profile which extends from the mounting-end-part 5 with a straight portion 25 parallel to the longitudinal axis 16, and a recessed portion 28 placed far from the mounting-end-part 5, i.e. placed near the front end 27. In other words, the external diameter of the connecting device keeps constant to a first value, which is the maximum value, throughout the whole conductive-transmitting-portions 7, and has a second value, at said recessed portion 28, which is less than said first value. The connecting device 1 thus turns out to have the shape of a hollow-cylindrical-body which is externally provided with a grooved-front-end-zone.

As already above mentioned, this geometrical configuration enables to advantageously obtain the connecting device 1 by just working a metal sheet. Each zone of the connecting device 1 can be obtained for example by just cold-working the metal sheet. For instance, the cylindrical shape of the connecting device 1 may be obtained by rolling the metal sheet, whereas the contact-bent-ends 14, thus the external groove-surface 18 and the internal curved convex surface 17, can be obtained by locally folding the metal sheet. Differently from the prior art tulip systems, there is no need for expensive machining operations to obtain grooves on the finger elements, thus simplifying the manufacturing process with a consequent time and costs saving.

By working a metal sheet there is obtained a connecting device 1 having a thickness which is the same in every zone thereof. In particular, the thickness keeps constant along the whole finger-projections 10, thus ensuring everywhere the same electrical performances 1, such as a uniform contact-resistance behaviour. A better and uniform electrical conductivity performance throughout the entire connecting device 1 is achieved, with no undesired localized phenomenon of electrical resistance increase which may thermally stress the material.

Also a mechanical stress concentration is avoided in the connecting device 1 whose fatigue strength is improved as well.

Figure 10:
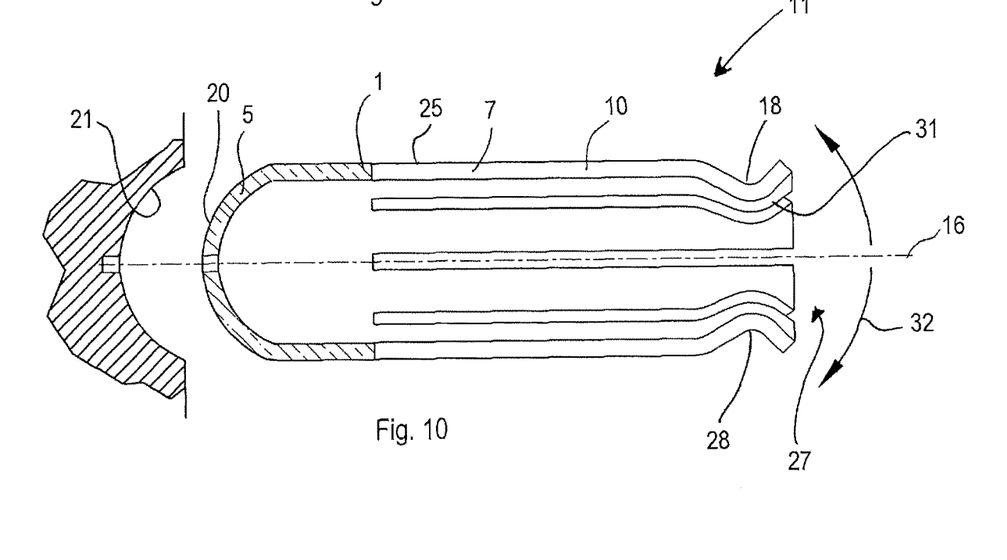
Figure 11:
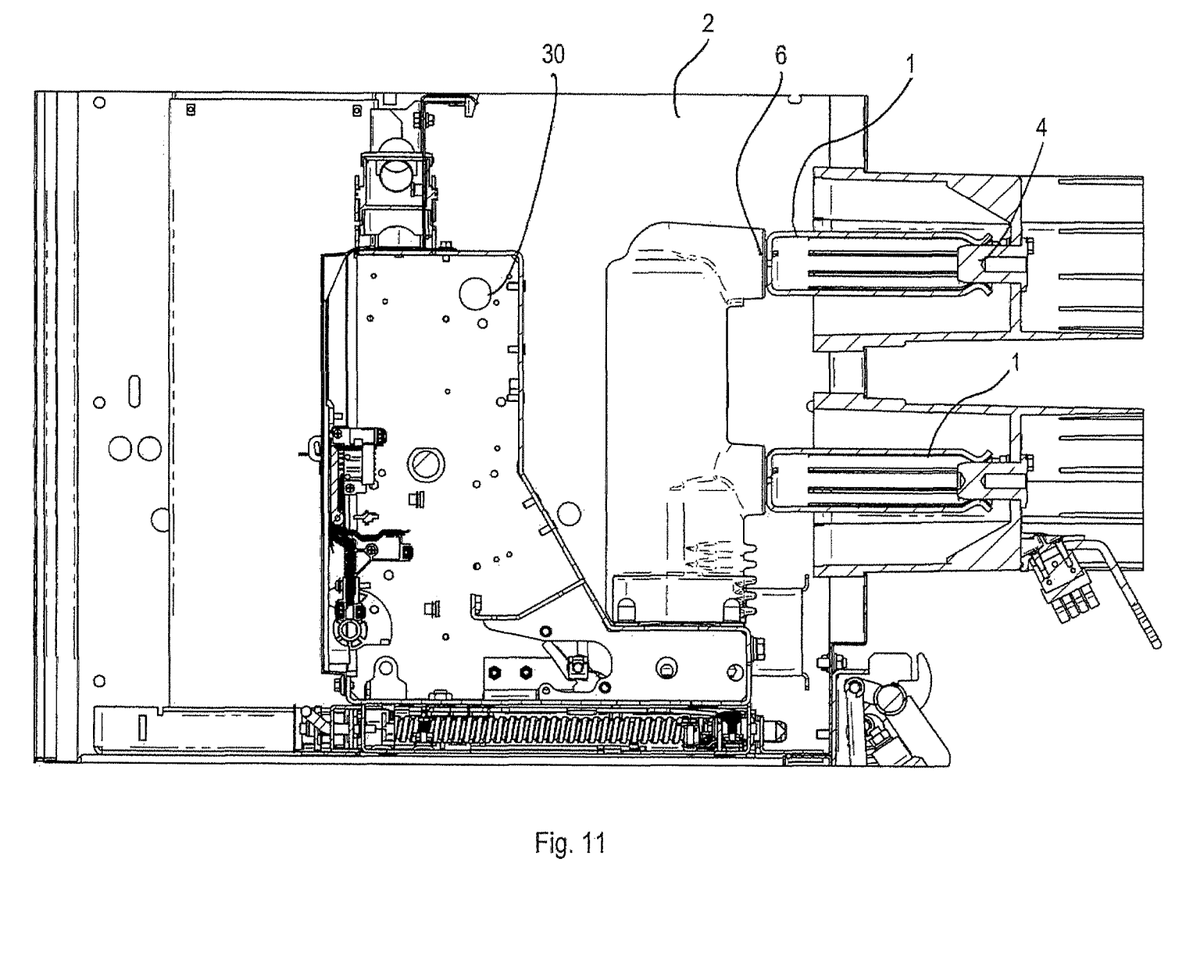
FIG. 11 is a side view showing a circuit-breaker provided with connecting devices according to the invention, in an insertion operative configuration within a switchgear.
Figure 12:
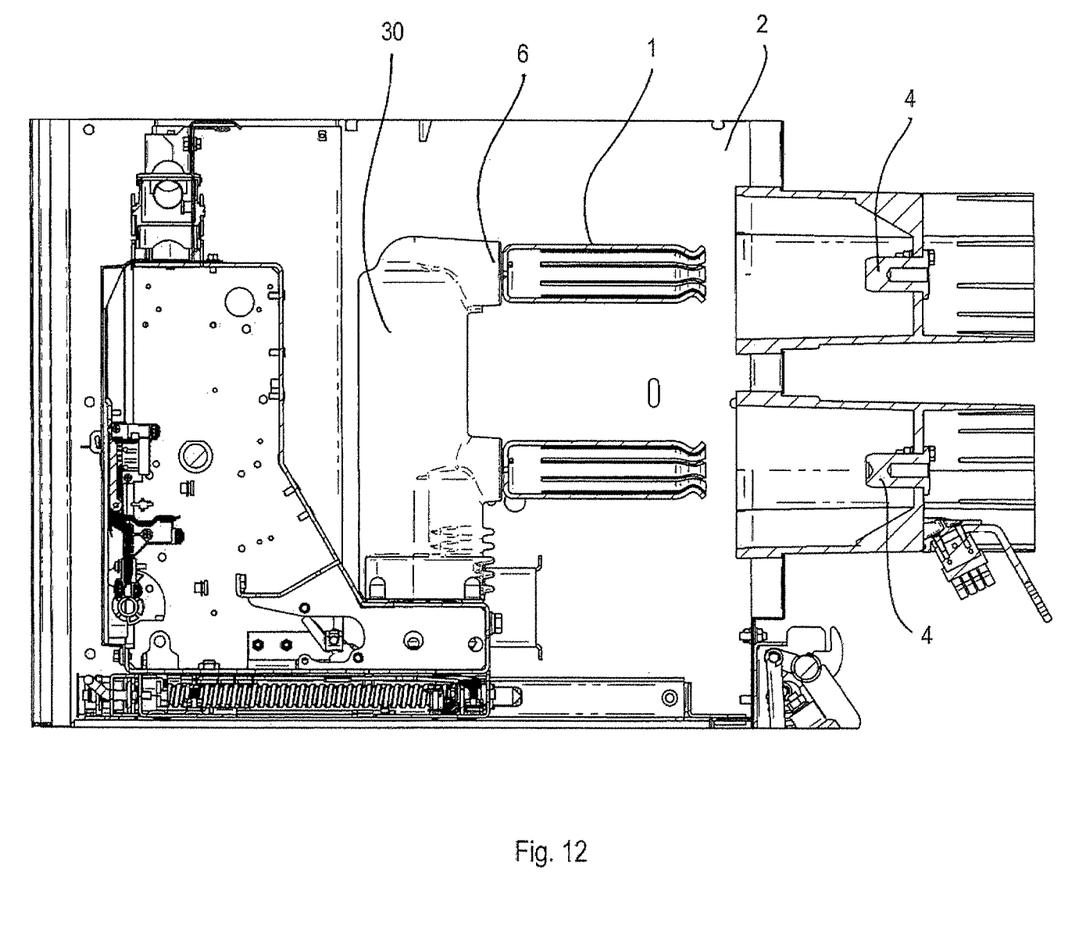
FIG. 12 shows the circuit breaker of FIG. 11 in an extraction position.

On the mounting-end-part 5, according to a version shown in FIG. 10, a convex-fitting-surface 20 is obtained which is suitable for matching a concave receiving seat 21 to be provided on the pole-terminal 6. The so configured convex-fitting-surface 20 engaging with the respective concave receiving seat 21 enables an adjustment-pivotal movement of the connecting device 1 with respect to the contact-stud-element 4 for facilitating a relative engagement thereof and overcoming any misalignment-problems. Therefore, by coupling the convex mounting-end-part 5 with the concave receiving seat 21 through a suitable mechanical connection element, a desired degree of relative rotational freedom is obtained, as indicated by the arrows 32, which makes engagement of the circuit breaker 30 in the insertion position within the switchgear 2 easier.

Figure 9:
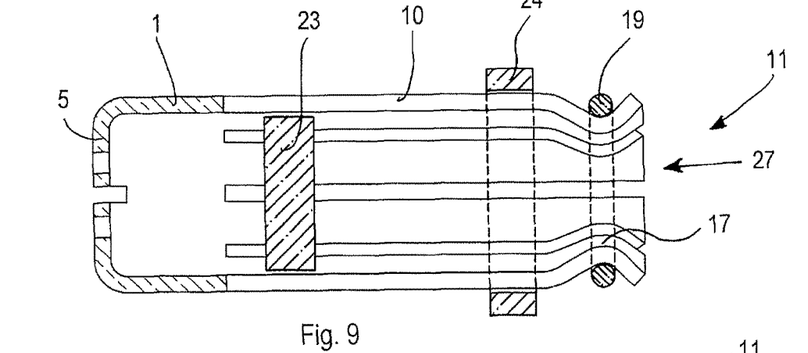
FIGS. 9 and 10 are longitudinal sections of further respective versions of the connecting-device of the invention.

According to a possible version shown in FIG. 9, the connecting device 1 further comprises a rest-abutment-element 23 for the finger-projections 10. In particular, the rest-abutment-element 23 is housed within the coupling cavity 15 and restingly receives the finger-projections 10 when the connecting device 1 is disengaged from the contact-stud-element 4. In other words, the finger-projections 10 may be resiliently pre-loaded so as to abut against such a rest-abutment-element 23 in the extraction position of the circuit breaker 30, and so as to get detached from such a rest-abutment-element 23 only once the contact-stud-element 4 engages with the contact-bent-ends 14 thus pushing the latter to a radially expanded position.

With reference to FIG. 9, the connecting device 1, in a further version which may be combined with any previously described version, comprises a displacement-control-element 24 configured for transmitting an over-displacement of a finger-projection 10 to a further finger-projection 10 which is arranged at an opposite side. The displacement-control-element 24 in particular comprises an annular element 24 which is externally arranged around the finger-projections 10. During functioning, if the contact-stud-element 4, due to a possible considerable misalignment, mainly interacts with only a part of the tulip-cluster-arrangement 50, a high elastic deformation, which otherwise would be produced on such a part, is mitigated by the annular element 24 which thus transfers and distributes it to an opposite fraction of the tulip-cluster-arrangement 50. In this way, substantially all the contact-bent-ends 14 follow the movement of the annular element 24 and reach a self-centering and alignment position relative to the contact-stud-element 4

The connecting device 1, owing to the above described configuration, is advantageously faster to assemble and fit compared with the prior art systems, and requires no particular and complicated tools for the installation.

It is evident, from the above description, that the connecting device 1 appears as a structurally simple and reliable solution for achieving an effective electrical transmission in a switchgear apparatus. This solution enables to successfully cope with misalignment problems in the connection owing to the highly flexible finger-projections 10.

The integral structure of the whole connecting device 1 or of each tulip-cluster-portion 3 enables to avoid localization and variability in the contact-resistance, in particular owing to the thickness constancy.

Owing to the single-piece configuration, a very high reduction of parts mechanically interconnected, and thus of junction zones, is achieved which means a general improvement on the overheating conditions, electrical-transmission-capability and mechanical resistance properties.

The connecting device 1 of the invention also proves to be a cheaper and more reliable technical solution compared with the prior art devices. More precisely, owing to the distinguishing structural configuration above described, a smaller quantity of conductive material is necessary for obtaining the connecting device 1 with respect to the prior art tulip devices.

The connecting device 1 is susceptible of modifications or variations all within the scope of the inventive concept as defined by the appended claims; any details may be replaced with technically equivalent elements.

One or more of the elements above described may be differently shaped and/or positioned, etcetera.

The materials, so long as they are compatible with the specific use, as well as the individual components, may be any according to the requirements and the state of the art.

The invention claimed is:

1. Connecting-device for a switchgear apparatus, comprising:
   tulip-cluster-portions for electrically engaging with a contact-stud-element;
   a mounting-end-part for the mechanical connection to a pole-terminal;
   conductive-transmitting-portions for transmitting electrical current from said contact-stud-element to said pole-terminal, each of said conductive-transmitting-portions extending from the respective tulip-cluster-portion to a respective base-portion of said mounting-end-part, wherein said tulip-cluster-portions with the respective conductive-transmitting-portions and with the respective base-portions are integral with one other so as to define respective single-piece-portions; and
   internally a rest-abutment-element for said finger-projections, said finger-projections being resiliently preloaded so as to abut against said rest-abutment-element when said connecting device is disengaged from said contact-stud-element.

2. Connecting device according to claim 1, wherein said single-piece-portions are integral with one other so as to define together a single enbloc-body.

3. Connecting device according to claim 1, wherein said single-piece-portions are configured as distinct elements which are configured to be coupled together for defining one assembled-body.

4. Connecting device according to claim 1, wherein each tulip-cluster-portion comprises one or more finger-projections projecting in a cantilever way from said mounting-end-part so as to delimit a coupling-cavity for said contact-stud-element, each finger-projection having a flexing-strip-zone included in the respective conductive-transmitting-portion, and a contact-bent-end for going into contact with said contact-stud-element, said flexing-strip-zone being configured for elastically flexing upon a relative inserting-engagement of said contact-stud-element into said coupling-cavity.

5. Connecting device according to claim 4, wherein the thickness remains constant along each whole finger-projection.

6. Connecting device according to claim 4, wherein said contact-bent-end protrudes towards a longitudinal axis of said coupling-cavity and comprises an internal curved surface which is configured to promote a resilient deformation of the respective finger-projection upon a pushing-action of said contact-stud-element in order to facilitate insertion of the latter into said coupling-cavity.

7. Connecting device according to claim 6, wherein said internal curved surface has a convex profile according to a plane which is parallel to said longitudinal axis, said internal curved surface having a concave profile according to a plane which is transverse to said longitudinal axis, said concave profile having a bend-radius configured according to an external bend-radius of said contact-stud-element in order to achieve a required extended contact-area in a mutual engagement configuration.

8. Connecting device according to claim 6, wherein on each contact-bent-end there is obtained an external groove-surface configured for receiving an auxiliary elastic element configured for urging said finger-projections towards a mutual radially collapsed position.

9. Connecting device according to claim 4, wherein said finger-projections are separated from one other by elongated gaps extending from said mounting-end-part to a front end defined by said contact-bent-ends, said elongated gaps being configured for achieving the required resilient flexibility for said finger-projections and being configured for promoting a heat-dissipating-function.

10. Connecting device according to claim 1, wherein on said mounting-end-part a convex-fitting-surface is obtained which is suitable for matching a concave receiving seat to be provided on said pole-terminal so as to enable an adjustment-pivotal movement of said connecting device with respect to said contact-stud-element for facilitating a relative engagement thereof.

11. Connecting device according to claim 1 comprising a displacement-control-element configured for mitigating, transmitting and distributing an over-displacement of a finger-projection to a further finger-projection which is arranged at an opposite side.

12. Connecting device according to claim 1, which includes portions of a sheared, folded and cold-rolled metal sheet.

13. Switching device comprising one or more connecting devices according to claim 1.

14. Switchgear apparatus comprising a switching device according to claim 13, wherein said switching device includes a circuit breaker.

* * * * *